(12) United States Patent
Onodera et al.

(10) Patent No.: US 11,593,848 B2
(45) Date of Patent: Feb. 28, 2023

(54) CAR SHARING FEE SETTING DEVICE, METHOD AND SYSTEM

(71) Applicant: TOYOTA JIDOSHA KABUSHIKI KAISHA, Toyota (JP)

(72) Inventors: Aya Onodera, Nisshin (JP); Akihiko Nakanishi, Nisshin (JP); Takumi Hamajima, Osaka (JP); Yusuke Tsutsui, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1149 days.

(21) Appl. No.: 16/183,152

(22) Filed: Nov. 7, 2018

(65) Prior Publication Data

US 2019/0139106 A1    May 9, 2019

(30) Foreign Application Priority Data

Nov. 9, 2017   (JP) .............................. JP2017-216611

(51) Int. Cl.
*G06Q 30/02* (2012.01)
*G06Q 30/06* (2012.01)
(Continued)

(52) U.S. Cl.
CPC ..... *G06Q 30/0283* (2013.01); *G06Q 30/0278* (2013.01); *G06Q 30/0284* (2013.01); *G06Q 30/0645* (2013.01); *G06Q 50/06* (2013.01)

(58) Field of Classification Search
CPC ........... G06Q 30/0283; G06Q 30/0278; G06Q 30/0645; G06Q 10/02; G06Q 50/01
See application file for complete search history.

(56) References Cited

U.S. PATENT DOCUMENTS 11,010,827 B1 *   5/2021  Latronico .............. G06Q 30/08
2002/0174077 A1  11/2002  Yui et al.
(Continued)

FOREIGN PATENT DOCUMENTS

CN       1920873 A     2/2007
CN     104992364 A    10/2015
(Continued)

OTHER PUBLICATIONS

Clair Johnson, Characterizing Plug-In Hybrid Electric Vehicle Consumers Most Influenced by California's Electric Vehicle Rebate, Jan. 2017, Journal of the Transportation Research Board (Year: 2017).*

*Primary Examiner* — Resha Desai
*Assistant Examiner* — Ismail A Manejwala
(74) *Attorney, Agent, or Firm* — Hunton Andrews Kurth LLP

(57) ABSTRACT

When a user who utilizes a gasoline-powered vehicle shifts to EV car sharing, and the user wishes to have applied a discount for shifting to EV car sharing, a fee setting device setting a car sharing fee requests the user to input a cost paid in the past to purchase gasoline. The fee setting device registers the cost paid to purchase gasoline, as input, and if the cost paid to purchase gasoline is a predetermined amount or more, the fee setting device selects a first discount and sets a basic fee. If the cost paid to purchase gasoline is less than the predetermined amount, the fee setting device selects a second discount and sets a basic fee.

2 Claims, 12 Drawing Sheets

(51) Int. Cl.
*G06Q 50/06* (2012.01)
*G06Q 30/0283* (2023.01)
*G06Q 30/0645* (2023.01)

(56) References Cited

U.S. PATENT DOCUMENTS

| | | | | |
|---|---|---|---|---|
| 2003/0172016 | A1* | 9/2003 | Chandran | G06Q 30/0201 |
| | | | | 705/35 |
| 2008/0277183 | A1 | 11/2008 | Huang et al. | |
| 2010/0106534 | A1* | 4/2010 | Robinson | G06Q 10/02 |
| | | | | 705/5 |
| 2013/0218724 | A1* | 8/2013 | Moretti | G06Q 50/30 |
| | | | | 705/26.63 |
| 2013/0325694 | A1* | 12/2013 | Harlingten | G06Q 40/025 |
| | | | | 705/38 |
| 2014/0253306 | A1 | 9/2014 | Gillespey | |
| 2017/0270490 | A1* | 9/2017 | Penilla | G06Q 30/08 |
| 2018/0154797 | A1* | 6/2018 | Sawada | B60L 7/26 |
| 2018/0293687 | A1* | 10/2018 | Hardee | G08G 1/202 |

FOREIGN PATENT DOCUMENTS

| | | |
|---|---|---|
| CN | 105913304 A | 8/2016 |
| EP | 02991025 A1 | 3/2016 |
| JP | 2002222373 A | 8/2002 |
| JP | 2007114854 A | 5/2007 |
| JP | 2010244492 A | 10/2010 |
| JP | 2013232129 A | 11/2013 |
| JP | 5670086 B2 | 2/2015 |
| JP | 5700781 B2 | 4/2015 |
| RU | 144169 U1 | 8/2014 |
| RU | 2595261 C2 | 8/2016 |

\* cited by examiner

| USER ID | WISH TO HAVE DISCOUNT APPLIED FOR SHIFTING TO CAR SHARING | COST PAID TO PURCHASE GASOLINE | BASIC FEE | AMOUNT OF POWER MONTHLY USED 700 | | |
|---|---|---|---|---|---|---|
| | | | | JANUARY | ... | DECEMBER |
| 001 | O | AA | 1ST DISCOUNT APPLIED | a | | d |
| 002 | O | BB | 2ND DISCOUNT APPLIED | b | ... | e |
| 003 | – | – | BASIC FEE | c | | f |
| ⋮ | ⋮ | ⋮ | ⋮ | ⋮ | | ⋮ |

| VEHICLE INFORMATION | TIME ZONE | | | | |
|---|---|---|---|---|---|
| | 0 TO 1 O'CLOCK | 1 TO 2 O'CLOCK | ... | 23 TO 0 O'CLOCK |
| 310 | 001 | 001 | | – |
| 320 | – | 002 | ... | 003 |
| ⋮ | ⋮ | ⋮ | | ⋮ |

| TRADE-IN | BASIC FEE | METERED FEE RATE | |
|---|---|---|---|
| NO | A | | RATE 1 |
| YES | B | $T < Z$ | RATE 2 |
| | | $Z \leq T < W$ | RATE 3 |
| | | $W \leq T$ | RATE 4 |

800A

700A

| USER ID | WHETHER TRADE-IN DONE OR NOT | TRADE-IN PRICE T | TRADE-IN DISCOUNT | METERED FEE RATE |
|---|---|---|---|---|
| 001 | ○ | T1 ($\geq W$) | B | RATE 4 |
| 002 | – | – | A | RATE 1 |
| 003 | ○ | T2 ($< Z$) | B | RATE 2 |
| ⋮ | ⋮ | ⋮ | ⋮ | ⋮ |

FIG.15

| TRADE-IN | BASIC FEE | |
|---|---|---|
| NO | | C |
| YES | T < J | D |
| | J ≤ T < K | E |
| | K ≤ T | F |

| USER ID | WHETHER TRADE-IN DONE OR NOT | TRADE-IN PRICE T | TRADE-IN DISCOUNT |
|---|---|---|---|
| 001 | ○ | T3 ( ≥ K) | F |
| 002 | – | – | C |
| 003 | ○ | T4 ( < J) | D |
| ⋮ | ⋮ | ⋮ | ⋮ |

CAR SHARING FEE SETTING DEVICE, METHOD AND SYSTEM

This nonprovisional application is based on Japanese Patent Application No. 2017-216611 filed on Nov. 9, 2017 with the Japan Patent Office, the entire contents of which are hereby incorporated by reference.

BACKGROUND

Field

The present disclosure relates to setting a car sharing fee for an electric vehicle traveling using power stored in a power storage device.

Description of the Background Art

Car sharing allowing a plurality of users to share a single vehicle is increasingly utilized. Car sharing means that a user himself/herself does not own a vehicle and instead obtains membership of a car sharing business operation and appropriately utilizes a vehicle owned by the business operator. In recent years, as electric vehicles are increasingly used, the vehicles are also increasingly used in car sharing.

Electric vehicle (EV) car sharing is expected to spread in view of approaches for environmental issues such as reduction of $CO_2$ emissions, and relieving congestion by reducing the number of vehicles used.

Japanese Patent No. 5700781 discloses an in-vehicle device that displays a cost of power for running an electric vehicle, and an estimated cost for running the electric vehicle if the vehicle should run with gasoline serving as an energy source. The in-vehicle device disclosed in Japanese Patent No. 5700781 promotes widespread use of electric vehicles by notifying users that electric vehicles are energy-efficient.

SUMMARY

While EV car sharing is increasingly utilized, not a few users are hesitant to shift from a gasoline-powered vehicle to an electric vehicle, and furthermore, to EV car sharing.

Although the in-vehicle device disclosed in Japanese Patent No. 5700781 has a possibility of leading to promoting shifting from a gasoline-powered vehicle to an electric vehicle by notifying a user that the electric vehicle is more energy-efficient than the gasoline-powered vehicle, it has not led to promotion of utilization of EV car sharing.

The present disclosure has been made to solve the above-described problem, and it is an object thereof to make shifting to EV car sharing beneficial to encourage a user to utilize EV car sharing.

A fee setting device to set a car sharing fee according to the present disclosure sets for a user a utilization fee for sharing an electric vehicle. The fee setting device comprises a storage unit configured to store information about a vehicle previously owned by the user, and a fee setting unit configured to set the utilization fee using the information.

A method for setting a car sharing fee according to another aspect of the present disclosure is a fee setting method for setting for a user a utilization fee for sharing an electric vehicle, comprising: storing information about a vehicle previously owned by the user; and setting the utilization fee using the information.

A fee setting system to set a car sharing fee according to another aspect of the present disclosure comprises a fee setting device to set a utilization fee for sharing an electric vehicle. The fee setting device is configured to store information about a vehicle previously owned by a user, and set the utilization fee using the information.

According to the above configuration, information about a vehicle owned by a user utilizing EV car sharing can be reflected in a utilization fee for EV car sharing. This allows a fee to be set to promote shifting from owning a vehicle to EV car sharing.

Preferably, the information includes a cost paid to purchase fuel for the owned vehicle within a determined period of time in the past.

According to the above configuration, a utilization fee is set using a cost paid to purchase fuel such as gasoline or light oil within a determined period of time in the past. This allows a fee to be set to allow users who utilize gasoline-, diesel-, and similarly powered vehicles to enjoy a benefit in shifting to EV car sharing. Setting a utilization fee with reference to a cost paid to purchase fuel allows the fee to be set to promote shifting from owning a vehicle to EV car sharing.

Preferably, when the cost paid to purchase fuel is a predetermined amount or more, the fee setting unit is configured to set a utilization fee of an amount smaller than when the cost paid to purchase fuel is less than the predetermined amount.

According to the above configuration, for a user whose cost paid to purchase fuel is a predetermined amount or more, a utilization fee is set that is an amount smaller than that for a user whose cost paid to purchase fuel is less than the predetermined amount. A user who pays a predetermined amount of cost or more to purchase fuel and hence frequently uses a gasoline-powered or similar vehicle is expected to also frequently use a vehicle after the user has shifted to EV car sharing. By setting for a user frequently using a gasoline-powered or similar vehicle a fee allowing the user to obtain a benefit from shifting to EV car sharing, it is possible to promote utilization of EV car sharing.

Preferably, the utilization fee includes a fixed-fee portion in which a fee per unit period of time is fixed, and a metered-fee portion in which a fee varies with an amount of power used by the user. The fee setting unit is configured to set the fixed-fee portion alone as the utilization fee for the unit period of time when the fixed-fee portion is an amount larger than the metered-fee portion, whereas the fee setting unit is configured to set the fixed-fee portion and the metered-fee portion as the utilization fee for the unit period of time when the fixed-fee portion is an amount smaller than the metered-fee portion.

According to the above configuration, the fixed-fee portion alone is set as the fee for the unit period of time when the fixed-fee portion is an amount larger than the fee of the metered-fee portion. As a result, a user can obtain a significant satisfaction with a utilization fee even when there is a unit period of time for which the user does not often utilize EV car sharing.

Preferably, the fee setting unit is configured to use an average amount of metered fee portions of a plurality of unit periods of time of a predetermined period of time defined by the plurality of unit periods of time, to set a fixed-fee portion per unit period of time for a subsequent predetermined period of time.

According to the above configuration, a fixed-fee portion per unit period of time of a subsequent predetermined period of time is set depending on an average amount of metered fee portions of unit periods of time of a previous predetermined period of time. Accordingly, for a user who frequently uses EV car sharing, a utilization fee for the subsequent predetermined period of time is set to be a small amount, and a fee is thus set to allow the user to enjoy a benefit in shifting to EV car sharing.

Preferably, the information includes trade-in price information indicating information about a trade-in price of the owned vehicle.

According to the above configuration, a utilization fee is set using trade-in price information of the owned vehicle. This allows a fee to be set to allow a user who trades in his/her owned vehicle to enjoy a benefit in shifting to EV car sharing. Setting a utilization fee with reference to trade-in price information of the owned vehicle allows the fee to be set to promote shifting from owning a vehicle to EV car sharing.

Preferably, the trade-in price information includes information of whether a trade-in price is set. When the trade-in price is set, the fee setting unit is configured to set a utilization fee of an amount smaller than when no trade-in price is set.

According to the above configuration, for a user who trades in his/her owned vehicle, a utilization fee is set that is an amount smaller than that for a user who does not trade in his/her owned vehicle. This allows a fee to be set to allow a user who utilizes his/her owned vehicle to enjoy a benefit in trading the vehicle to shift to EV car sharing. This can promote shifting from owning a vehicle to EV car sharing.

Preferably the trade-in price information includes information of whether a trade-in price is set. The utilization fee includes a fixed-fee portion in which a fee per unit period of time is fixed, and a metered-fee portion in which a fee varies with an amount of power used by the user. When the trade-in price is set, the fee setting unit is configured to set the fixed-fee portion to be an amount smaller than when no trade-in price is set. When the trade-in price is a larger amount, the fee setting unit is configured to set the metered-fee portion to be a smaller amount.

According to the above configuration, when a vehicle is traded in, the fixed-fee portion is set to be an amount smaller than when the vehicle is not traded in. In addition, when a vehicle is traded in, a metered-fee portion depending on the trade-in price is set, and when the trade-in price is a larger amount, the metered-fee portion is set to be a smaller amount. This allows a fee to be set to provide a significant satisfaction to users who own vehicles of different price ranges. This can encourage different classes of customers to shift to EV car sharing.

Preferably the trade-in price information includes information of whether a trade-in price is set. The utilization fee includes a fixed-fee portion in which a fee per unit period of time is fixed, and a metered-fee portion in which a fee varies with an amount of power used by the user. When the trade-in price is set, the fee setting unit is configured to set the fixed-fee portion to be an amount smaller than when no trade-in price is set. When the trade-in price is a larger amount, the fee setting unit is configured to set the fixed-fee portion to be a smaller amount.

According to the above configuration, when a vehicle is traded in, the fixed-fee portion is set to be an amount smaller than when the vehicle is not traded in. In addition, when a vehicle is traded in, a fixed-fee portion depending on the trade-in price is set, and when the trade-in price is a larger amount, the fixed-fee portion is set to be a smaller amount. This allows a fee to be set to provide a significant satisfaction to users who own vehicles of different price ranges. This can encourage different classes of customers to shift to EV car sharing.

Preferably the trade-in price information includes information of whether a trade-in price is set. The utilization fee includes a fixed-fee portion in which a fee per unit period of time is fixed, and a metered-fee portion in which a fee varies with an amount of power used by the user. When the trade-in price is set, the fee setting unit is configured to set the metered-fee portion to be an amount smaller than when no trade-in price is set. When the trade-in price is a larger amount, the fee setting unit is configured to set the metered-fee portion to be a smaller amount.

According to the above configuration, when a vehicle is traded in, the metered-fee portion is set to be an amount smaller than when the vehicle is not traded in. In addition, when a vehicle is traded in, a metered-fee portion depending on the trade-in price is set, and when the trade-in price is a larger amount, the metered-fee portion is set to be a smaller amount. This allows a fee to be set to provide a significant satisfaction to users who own vehicles of different price ranges. This can encourage different classes of customers to shift to EV car sharing.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 15 is a diagram showing an example of a configuration of a utilization fee list according to a first modification.

FIG. 16 is a diagram showing an example of a configuration of a user list according to the first modification.

DESCRIPTION OF THE PREFERRED EMBODIMENTS

The present disclosure will now be described in embodiments hereinafter in detail with reference to the drawings. In the figures, identical or corresponding components are identically denoted and will not be described repeatedly.

First Embodiment

Configuration of Fee Setting System

Figure 1:
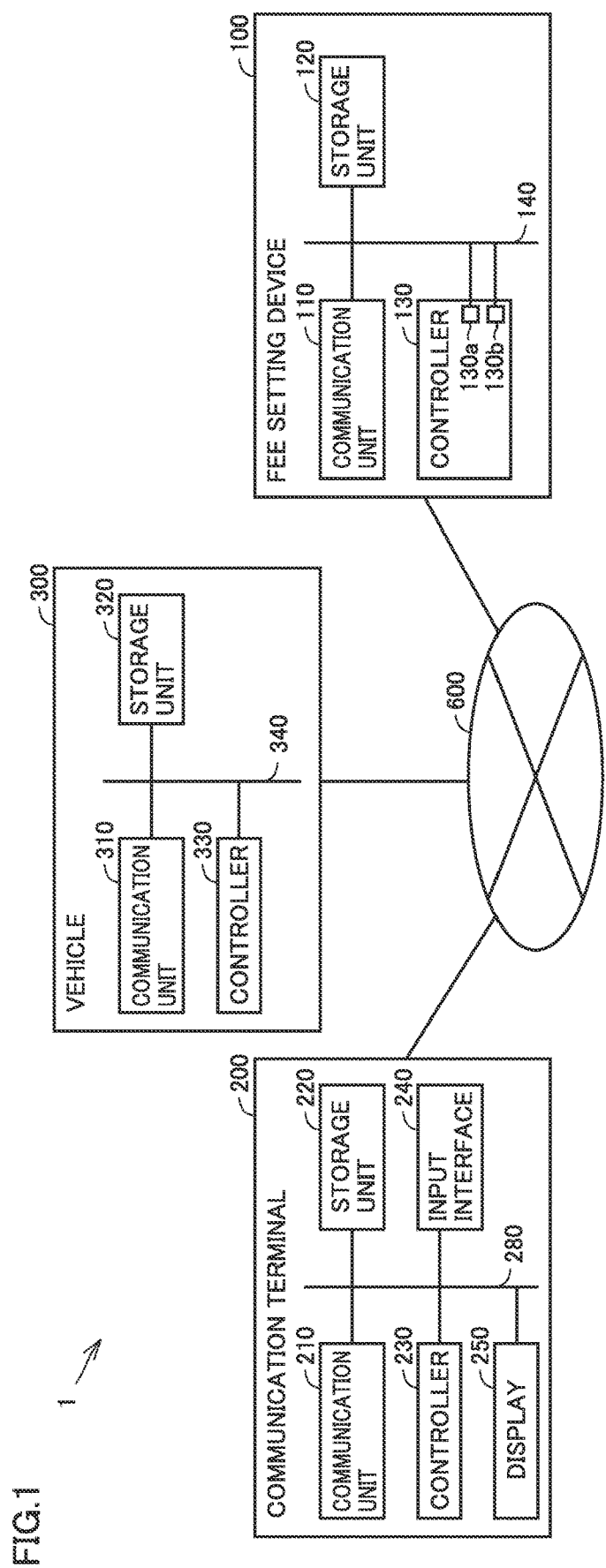
FIG. 1 is a diagram schematically showing an overall configuration of a fee setting system according to a first embodiment.

FIG. 1 is a diagram schematically showing an overall configuration of a fee setting system 1 according to a first embodiment. As shown in FIG. 1, fee setting system 1 according to the first embodiment includes a fee setting device 100, a communication terminal 200, and a vehicle 300 which is an electric vehicle (hereinafter, also simply referred to as a "vehicle").

Fee setting device 100 includes a communication unit 110, a storage unit 120, and a controller 130. Each component is communicatively connected by a communication bus 140.

Communication unit 110 is configured to be capable of communicating with a communication unit 210 of communication terminal 200 of a user (a communication terminal such as a smartphone or a personal computer), for example. Communication units 110 and 210 communicate with each other via a communication network 600 such as the Internet or a telephone line.

Furthermore, communication unit 110 is configured to be capable of communicating with communication unit 310 of vehicle 300. Communication units 110 and 310 communicate with each other via communication network 600.

Storage unit 120 includes, for example, a large-capacity storage device such as a hard disk or a solid state drive. Storage unit 120 stores, for example, information of a user who has membership in car sharing, a cost paid to purchase gasoline serving as information about a vehicle previously owned by the user (hereinafter, also referred to as an "owned vehicle"), a state of charge (SOC), positional information and the like of vehicle 300, and the like.

A cost paid to purchase gasoline is information about a cost paid for gasoline previously purchased by a user for his/her owned vehicle. As a cost paid to purchase gasoline, for example, a cost paid for gasoline purchased in a past one year from the date of a user's membership registration, is used. A period of time applied for a cost paid to purchase gasoline is not limited to a past one year and may be set as appropriate. For example, it may be the past half year from the user's membership registration date or the past two years from the user's membership registration date. Note that a cost paid to purchase gasoline corresponds in the present disclosure to "a cost paid to purchase fuel." While in the following a gasoline-powered vehicle will be described, if an owned vehicle is a diesel-powered vehicle, a cost paid to purchase diesel oil corresponds to that of purchasing fuel.

Storage unit 120 stores a user list 700, as described hereinafter, and a reservation list in which vehicles' reservation statuses are registered.

Controller 130 includes a CPU (central processing unit) 130a, a memory (ROM and RAM) 130b, an input/output port (not shown) for inputting/outputting various signals, and the like. Controller 130 is configured to execute predetermined computation processing based on information stored in storage unit 120, information received from communication terminal 200 via communication unit 110, and/or the like. Controller 130 sets a car sharing utilization fee with reference to a cost paid to purchase gasoline. Controller 130 will more specifically be described later.

Communication terminal 200 includes communication unit 210, storage unit 220, a controller 230, an input interface 240, and a display 250. Each component is communicatively connected by a communication bus 280.

Communication unit 210 is configured to be capable of communicating with communication unit 110 of fee setting device 100. Communication units 110 and 210 communicate with each other via communication network 600.

Communication unit 210 is configured to be capable of communicating with communication unit 310 of vehicle 300. Communication units 210 and 310 communicate with each other via communication network 600.

Storage unit 220 includes, for example, a large-capacity storage device such as a flash memory, a hard disk, a solid state drive or the like.

Controller 230 is configured to execute predetermined computation processing based on information stored in storage unit 220 and information received from fee setting device 100 via communication unit 210, for example.

Input interface 240 is an input device in communication terminal 200. Input interface 240 is composed of a keyboard, a mouse, a touch panel, and the like, and accepts input operations done via the keyboard, the mouse, the touch panel, and the like.

Display 250 is a display device controlled by controller 230 to display an image. Display 250 is implemented for example as a liquid crystal panel or the like.

Vehicle 300 includes a communication unit 310, a storage unit 320, and a controller 330. Each component is communicatively connected by a communication bus 360.

Communication unit 310 is configured to be capable of communicating with communication unit 110 of fee setting device 100, communication unit 210 of communication terminal 200, and the like. Communications between communication unit 310 and communication units 110 and 210 are as has been described above, and accordingly, will not be described redundantly.

Storage unit 320 is, for example, a storage device including a nonvolatile memory, a hard disk, a solid state drive or the like. Storage unit 320 stores, for example, information of an SOC of a power storage device 307 mounted in vehicle 300, and the like.

Controller 330 includes, for example, a CPU, a memory (ROM and RAM), an input/output port for inputting and outputting various signals, and so forth, none of which is shown. Controller 330 is configured to execute predetermined computation processing based on information stored in the memory, storage unit 320, and the like.

Further, controller 330 monitors a state of power storage device 307 (see FIG. 2) mounted in vehicle 300. For example, controller 330 senses power storage device 307's voltage, current, and temperature and uses these values to calculate power storage device 307's SOC. The calculation of the SOC may be done using any well-known technique, and accordingly, will not be described specifically.

Further, when vehicle 300 shifts from a READY-OFF state to a READY-ON state, controller 330 transmits via communication unit 310 to fee setting device 100 start-of-utilization information serving as notification that utilization of vehicle 300 starts, and together with that information, controller 330 also transmits via communication unit 310 to fee setting device 100 vehicle information serving as information for identifying vehicle 300. When vehicle 300 has shifted from the READY-ON state to the READY-OFF state, controller 330 transmits to fee setting device 100 end-of-utilization information serving as notification that utilization of vehicle 300 ends. Note that the READY-ON state refers to a state in which vehicle 300 is capable of traveling, and the READY-OFF state refers to a state in which vehicle 300 is incapable of traveling.

Controller 330 causes storage unit 320 to store information of the calculated SOC. While vehicle 300 is in the READY-ON state and is being electrically charged, controller 330 periodically transmits the information of the calculated SOC to fee setting device 100. In response to a request from fee setting device 100, controller 330 transmits vehicle 300's SOC information to fee setting device 100 via communication unit 310. Further, when vehicle 300 shifts from the READY-ON state to the READY-OFF state, controller 330 transmits vehicle 300's SOC information to fee setting device 100 via communication unit 310.

Figure 2:
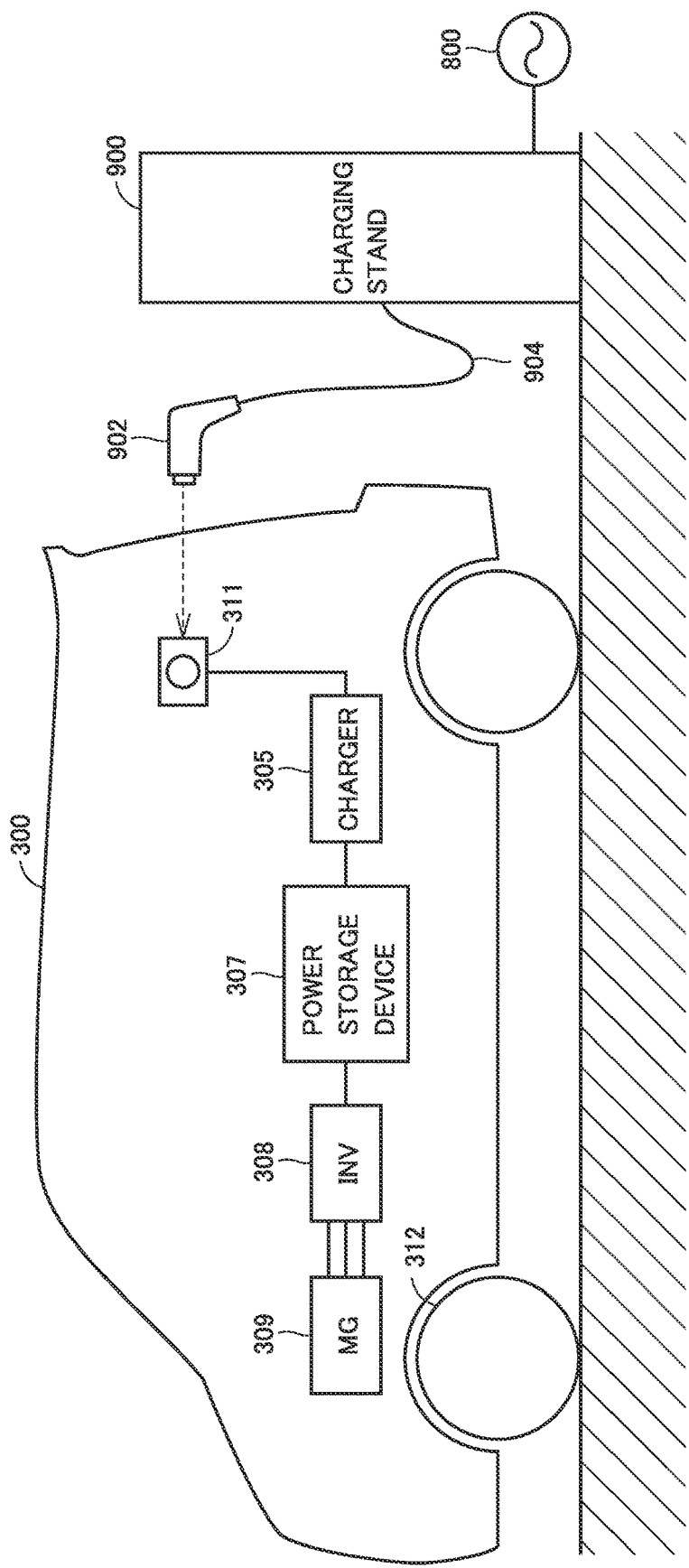
FIG. 2 is a diagram showing an example of a configuration for charging an electric vehicle according to the first embodiment.

FIG. 2 is a diagram showing an example of a configuration for charging an electric vehicle according to the present embodiment. FIG. 2 does not show communication unit 310, controller 330, or the like shown in FIG. 1.

As shown in FIG. 2, vehicle 300 further includes a charger 305, power storage device 307, an inverter 308, a motor generator 309, and an inlet 311.

When a charging stand 900 has a charging connector 902 attached to inlet 311, charger 305 charges power storage device 307 with power supplied from an external power source 800.

Power storage device 307 is configured using, for example, a secondary battery such as a nickel metal hydride battery or a lithium ion battery. Power storage device 307 may be any power storage device capable of storing power, and for example, a large-capacity capacitor may be used instead of power storage device 307.

Inverter 308 is a power conversion device which converts power between AC power and DC power. Inverter 308, for example, converts DC power of power storage device 307 into AC power and supplies it to motor generator 309. Further, inverter 308 receives AC power (regenerative power) from motor generator 309, converts it into DC power, and supplies it to power storage device 307 to electrically charge power storage device 307 therewith.

Motor generator 309 receives power supplied from inverter 308 and provides rotational force to a drive wheel 312. Drive wheel 312 is rotated by the rotational force provided by motor generator 309 to drive vehicle 300.

Inlet 311 is provided to vehicle 300 at an exterior portion of vehicle 300 together with a cover (not shown) such as a lid. Inlet 311 has a shape allowing charging connector 902 to be attached thereto. Inlet 311 and charging connector 902 both have contacts, respectively, incorporated therein, and when charging connector 902 is attached to inlet 311, the contacts come into contact with each other, and inlet 311 and charging connector 902 are thus electrically connected together.

Charging stand 900 is installed outside vehicle 300 and connected to charging connector 902 via charging cable 904. Charging stand 900 is electrically connected to a power source 500, and when charging connector 902 is attached to inlet 311, the power of power source 800 is supplied via charging stand 900, charging cable 904, and charging connector 902 to vehicle 300.

Figures 3, 4, 5:
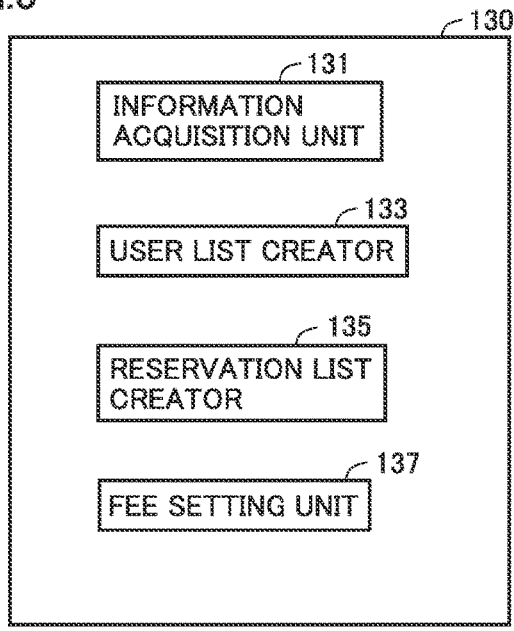
FIG. 3 is a functional block diagram showing a configuration of a controller of a fee setting device according to the first embodiment.
FIG. 4 is a diagram showing an example of a configuration of a user list according to the first embodiment.
FIG. 5 is a diagram showing an example of a configuration of a reservation list according to the first embodiment.

FIG. 3 is a functional block diagram showing a configuration of controller 130 of fee setting device 100 according to the first embodiment. Controller 130 includes an information acquisition unit 131, a user list creator 133, a reservation list creator 135, and a fee setting unit 137.

Information acquisition unit 131 obtains start-of-utilization information, end-of-utilization information, vehicle information, SOC information, and the like from vehicle 300 via communication unit 110. Furthermore, information acquisition unit 131 requests vehicle 300 via communication unit 110 to transmit SOC information, positional information and the like.

User list creator 133 creates user list 700, which will be described later, based on information or the like received from communication terminal 200, and stores user list 700 to storage unit 120. Whenever user list creator 133 receives information to be registered in user list 700, user list creator 133 updates user list 700 and stores it to storage unit 120.

Reservation list creator 135 creates a reservation list, which will be described later, based on information or the like received from communication terminal 200, and stores the reservation list to storage unit 120. Whenever a request for a reservation or a cancellation of a reservation is received from communication terminal 200, reservation list creator 135 updates a reservation list and stores it to storage unit 120.

Fee setting unit 137 sets a car sharing fee (an EV car sharing utilization fee) charged to a user who has utilized vehicle 300. Fee setting unit 137 sets a basic fee, a metered fee, and the like, which will be described later, in a method described later. Fee setting unit 137 also sets a car sharing fee based on an SOC that vehicle 300 has when a user returns vehicle 300 or the like.

(EV Car Sharing)

In car sharing using fee setting system 1 configured as above, for example, a user performs a user registration via communication terminal 200 with fee setting device 100 of a car sharing business operator. Fee setting device 100 issues a user ID to the user, and the user can use the user ID to make a reservation of a vehicle, and can thus use the vehicle from a reserved time.

In such car sharing, car sharing of electric vehicles (EV car sharing) is increasingly utilized as electric vehicles are increasingly used. EV car sharing is expected to spread in view of approaches for environmental issues such as reduction of $CO_2$ emissions and relieving congestion by reducing the number of vehicles used.

However, not a few users are hesitant to shift from a gasoline-powered vehicle to an electric vehicle, or from owning a gasoline-powered or similar vehicle to car sharing. Accordingly, there is a demand for a system encouraging such a user to utilize EV car sharing.

Accordingly, it is conceivable to set a fee for EV car sharing to make shifting from owning a gasoline-powered or similar vehicle to EV car sharing beneficial to encourage a user to utilize EV car sharing.

For the EV car sharing in the first embodiment, a user registered as a user of the EV car sharing is charged for each unit period of time a utilization fee charged for that unit period of time. A basic fee and a metered fee are set for the utilization fee. The basic fee is a fee incurred at a fixed price for each unit period of time for a user once the user has obtained membership of the EV car sharing. The basic fee varies every predetermined period of time composed of a plurality of unit periods of time. The metered fee is a fee incurred depending on an amount of power used as a user actually uses a vehicle for a unit period of time. In the first embodiment, the metered fee is calculated from a product of an amount of power used and a unit price of power. The basic fee corresponds to a "fixed-fee portion" according to the present disclosure. The metered fee corresponds to a "metered-fee portion" according to the present disclosure.

In the following description, the unit period of time is one month and the predetermined period of time is one year for the sake of illustration.

In the first embodiment, when a user who utilizes a gasoline-powered vehicle shifts to EV car sharing, and the user wishes to have applied a discount for shifting to EV car sharing, the user is requested to input a cost paid to purchase gasoline in the past. When the user registers the cost paid to purchase gasoline in the past, a basic fee of EV car sharing is discounted with reference to the cost paid to purchase gasoline in the past.

By setting a utilization fee with reference to a cost paid to purchase gasoline, it is possible set a fee which is beneficial to a user who shifts from owning a gasoline-powered or similar vehicle to EV car sharing. This promotes shifting from owning a gasoline-powered or similar vehicle to EV car sharing.

Furthermore, a discount rate for the basic fee is set according to the cost paid to purchase gasoline. For users who used more gasoline, larger discount rates are set. A user who pays a predetermined amount of cost or more to purchase gasoline and hence frequently uses a gasoline-powered or similar vehicle is expected to also frequently use a vehicle after the user has shifted to EV car sharing. By setting for a user frequently using a gasoline-powered or similar vehicle a fee allowing the user to obtain a benefit from shifting to EV car sharing, it is possible to promote utilization of EV car sharing.

Further, in the first embodiment, when a metered fee for a month is larger than the basic fee, a utilization fee is set by adding the basic fee and the metered fee together. In the first embodiment, when a metered fee for a month is equal to or less than the basic fee, a utilization fee for that month is set to the amount of the basic fee alone. For a month with EV car sharing not frequently utilized, the metered fee may be less than the basic fee. In such a case, the utilization fee does not include the metered fee, and the basic fee is alone set as the utilization fee. That is, in the first embodiment, in the case of metered fee>basic fee, the utilization fee is set as "utilization fee=basic fee+metered fee," whereas in the case of metered fee≤basic fee, the utilization fee is set as "utilization fee=basic fee."

Thus, for example, even a user with a small discount rate applied to a basic fee can obtain a sufficient satisfaction with a fee charged to him/her, as no metered fee is charged when the metered fee has an amount equal to or less than the basic fee. In addition, even a user who does not frequency utilize EV car sharing feels less discontented with the basic fee charged to the user, and the user can thus obtain a sufficient satisfaction with the utilization fee.

Furthermore, in the first embodiment, with reference to an average monthly metered fee for the current fiscal year, a discount rate for the basic fee for the next fiscal year is determined. A larger discount rate is set for a user having a larger average monthly metered fee.

As a result, a user who frequently utilizes EV car sharing can obtain a high satisfaction with the fee charged.

(User List 700)

FIG. 4 is a diagram showing an example of a configuration of user list 700 according to the first embodiment. As shown in FIG. 4, in the first embodiment, a user ID, whether a user wishes to have applied a discount for shifting to car sharing, a cost paid to purchase gasoline, a basic fee, and an amount of power used monthly, are registered in user list 700.

When a user completes registration of membership for EV car sharing, a user ID is issued for that user and used to identify the user.

A user's wish to have applied a discount for shifting to car sharing is registered when the user performs membership registration for EV car sharing, and this is done based on information selected using communication terminal 200.

A user who wishes to have applied the discount for shifting to car sharing is requested, in performing membership registration for EV car sharing, to input a cost paid to purchase gasoline. Once the user inputs via communication terminal 200 the cost paid to purchase gasoline, fee setting device 100 registers it in user list 700.

The cost paid to purchase gasoline may be automatically registered by using a scanner, a camera or the like to scan a receipt or a bill of a credit card to obtain an image thereof. The cost paid to purchase gasoline can be registered in a variety of known methods.

The discount for shifting to car sharing is calculated by fee setting device 100 using the cost paid to purchase gasoline, as registered, and when the discount for shifting to car sharing is applied, it is registered in user list 700 at a "basic fee" column. Specifically, when, of discounts for shifting to car sharing, a first discount, which will be described later, is applied, "first discount applied" is registered in the basic fee column, whereas when, of the discounts for shifting to car sharing, a second discount, which will be described later, is applied, "second discount applied" is registered in the basic fee column. When no discount for shifting to car sharing is applied, "basic fee" is registered in the basic fee column. The discount for shifting to car sharing is calculated, as will be described later.

As a total amount of power monthly used, an amount of power used by a user monthly as the user utilizes a vehicle is registered. In the first embodiment is shown an example of registering an amount of power used for each month of one year from January to December.

(Reservation List)

FIG. 5 is a diagram showing an example of a configuration of a reservation list according to the first embodiment. As shown in FIG. 5, vehicle information, time zones, and a user ID of a user each having reserved a vehicle for a time zone are registered in the reservation list. The reservation list shown in FIG. 5 shows a reservation status for a specific one day.

The vehicle information is information for identifying a vehicle. In the first embodiment, time zones are delimited every hour. A user makes a reservation for a vehicle via communication terminal 200.

In FIG. 5, a vehicle 310 is reserved by a user of a user ID 001 for a time zone from 0 to 1 o'clock and a time zone from 1 o'clock to 2 o'clock. A vehicle 320 is reserved by a user of a user ID 002 for a time zone from 1 o'clock to 2 o'clock and by a user of a user ID 003 for a time zone from 23 o'clock to 0 o'clock. Vehicle 320 is not reserved for a time zone from 0 o'clock to 1 o'clock.

While the reservation list according to the first embodiment is divided to have time zones each of one hour, the list is not limited as such. For example, the list may be divided to have time zones each of two hours or may be divided to have time zones each of 30 minutes. Alternatively, there may be no time zone provided and any time may be designated and reserved by a user.

(Process for Setting Basic Fee)

Figure 6:
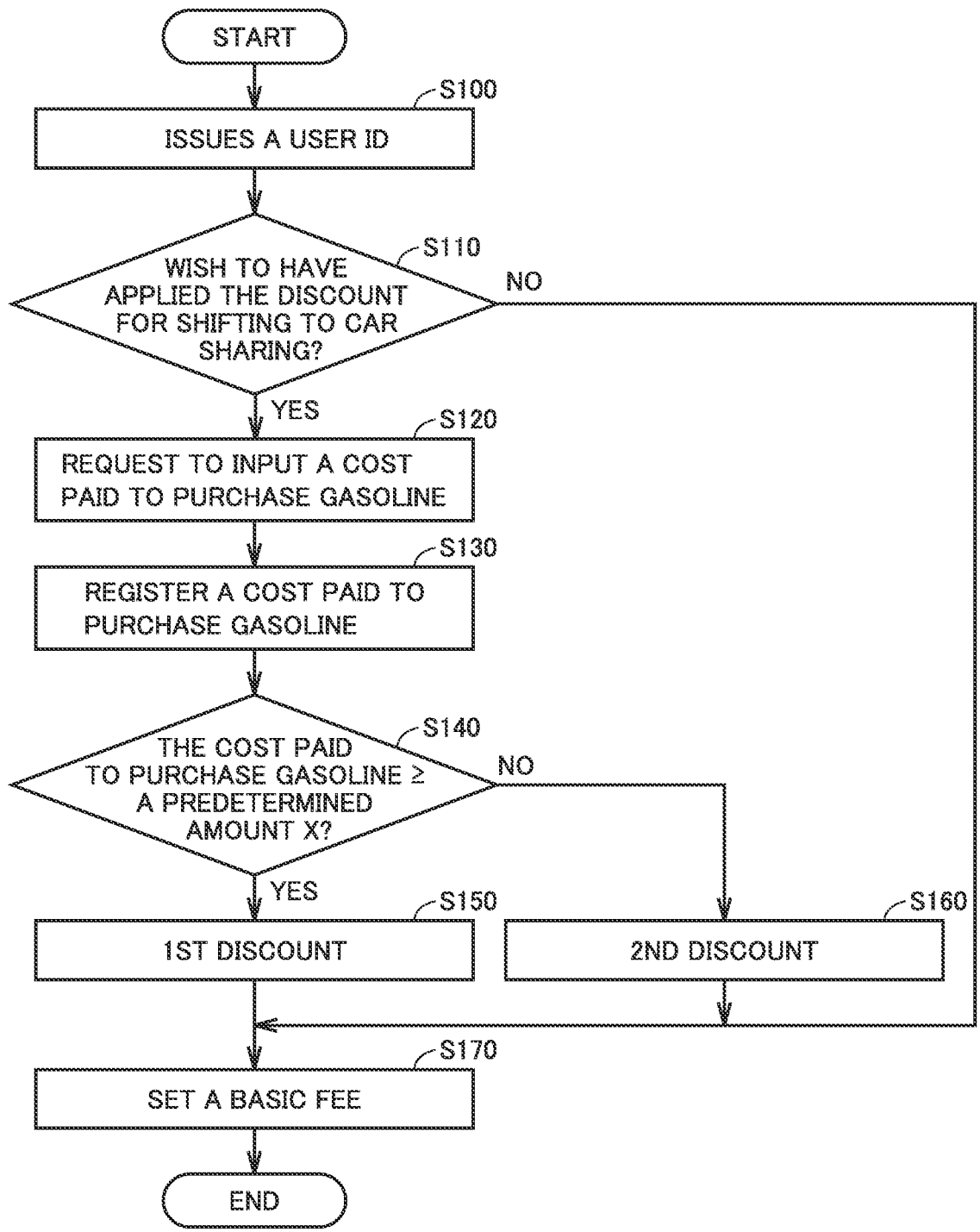
FIG. 6 is a flowchart showing a process performed in the fee setting device according to the first embodiment when utilizing the fee setting system is started.
Figure 7:
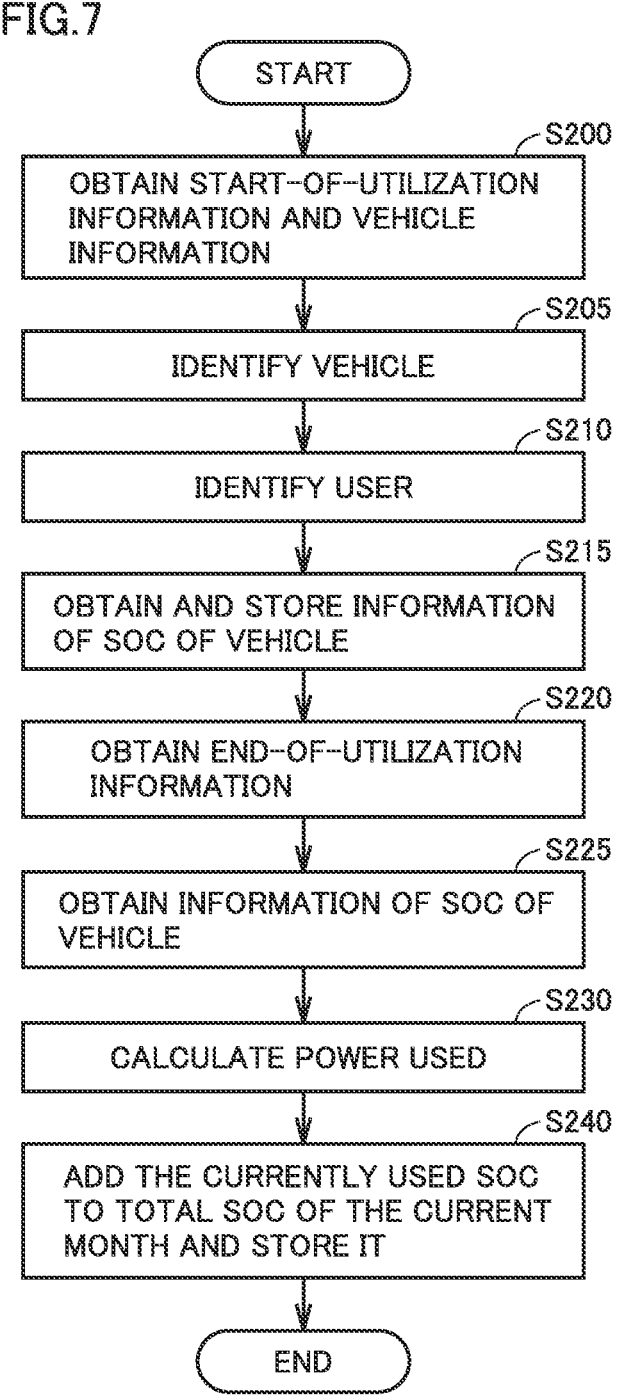
FIG. 7 is a flowchart showing a process performed in the fee setting device according to the first embodiment when a vehicle of the fee setting system is utilized.
Figure 8:
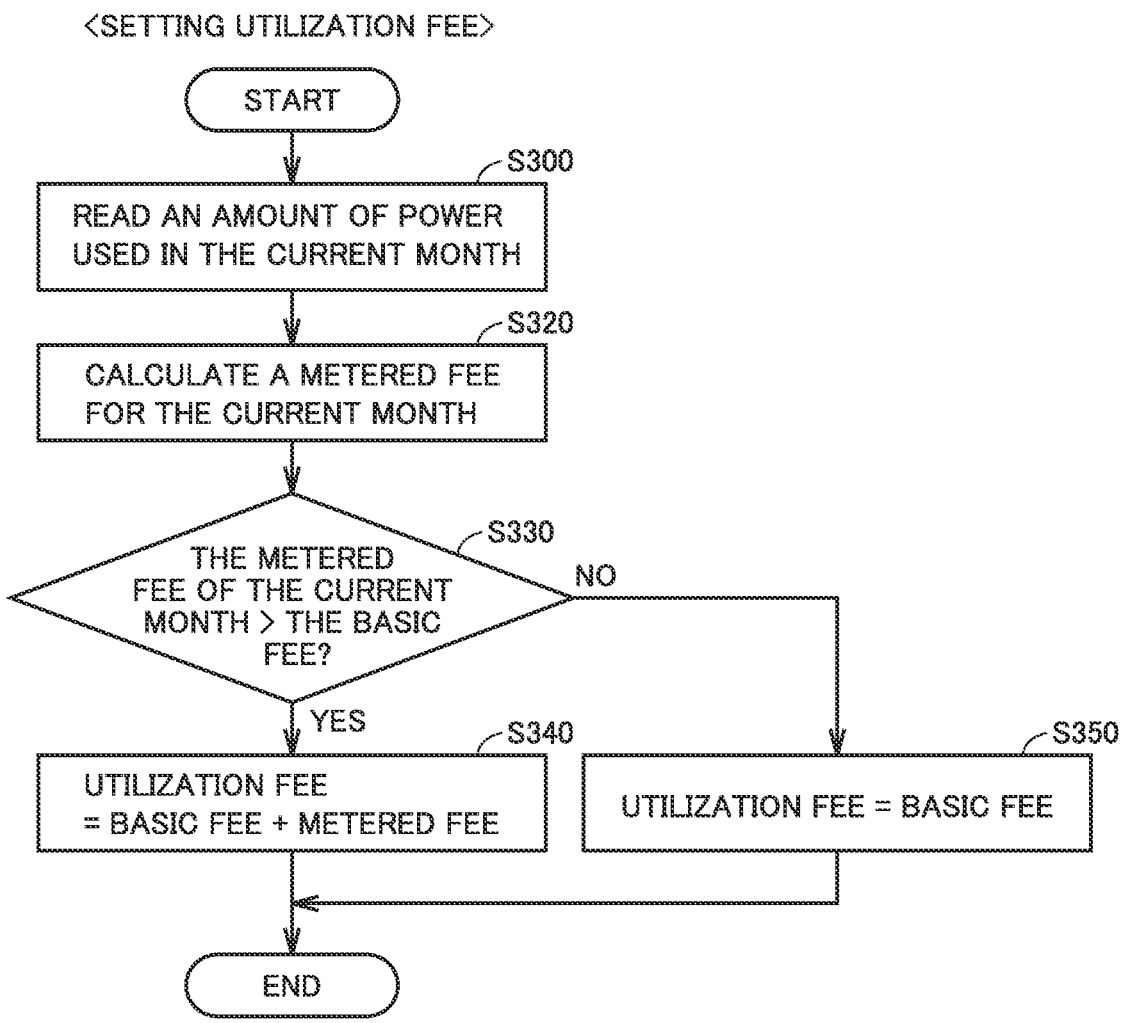
FIG. 8 is a flowchart showing a process performed in the fee setting device according to the first embodiment in setting a utilization fee.
Figure 9:
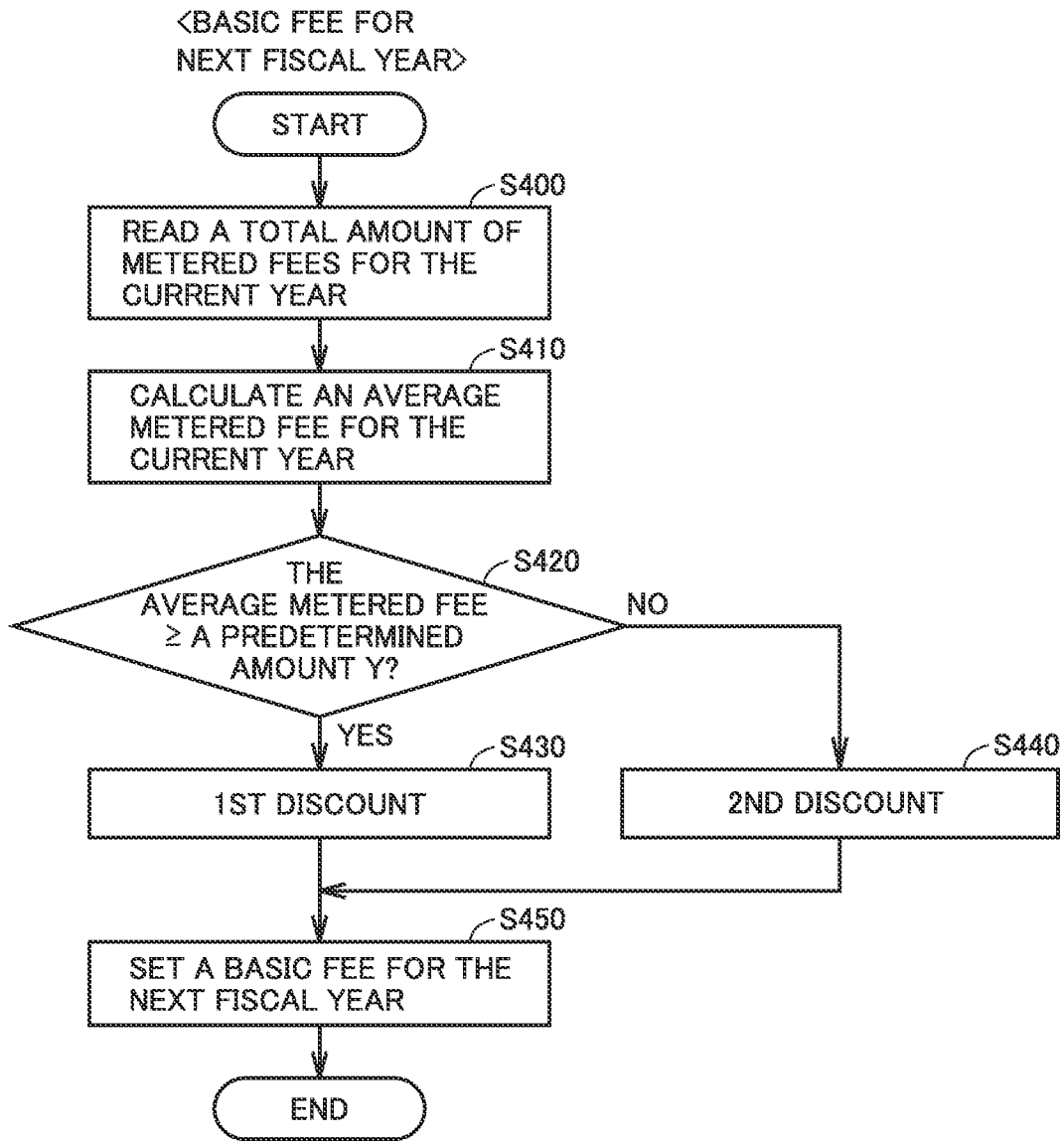
FIG. 9 is a flowchart showing a process performed in the fee setting device according to the first embodiment in setting a basic fee for a next fiscal year.

FIG. 6 is a flowchart showing a process performed in fee setting device 100 according to the first embodiment when utilizing fee setting system 1 is started. While each step shown in the flowchart shown in FIG. 6 is implemented by software processing done by fee setting device 100, a part thereof may be implemented by hardware (or electric circuitry) fabricated in fee setting device 100. Each step shown in the flowcharts shown in FIGS. 7, 8 and 9 is similarly discussed.

When controller 130 receives information from a user's communication terminal 200 via communication unit 110 regarding user registration for car sharing, controller 130 registers the received information and issues a user ID (step(S)100).

Controller 130 issues a request via communication unit 110 to communication terminal 200 to ask the user to make a selection as to whether the user wishes to have applied the discount for shifting to car sharing (S110). When controller 130 receives information from communication terminal 200 via communication unit 110 indicating that the user does not wish to have applied the discount for shifting to car sharing (NO in S110), controller 130 proceeds to S170 to set a basic fee and registers it in user list 700 (S170).

When controller 130 receives information from communication terminal 200 via communication unit 110 indicating that the user wishes to have applied the discount for shifting to car sharing (YES in S110), controller 130 proceeds to S120.

Controller 130 requests communication terminal 200 via communication unit 110 to input a cost paid to purchase gasoline for the past one year (S120). When controller 130 receives information from communication terminal 200 via communication unit 110 indicating that the cost paid to purchase gasoline has been received, controller 130 registers the received information in user list 700 (S130).

Controller 130 determines whether the cost paid to purchase gasoline is equal to or more than a predetermined amount X (S140). When controller 130 determines that the cost paid to purchase gasoline is equal to or more than the predetermined amount X (YES in S140), controller 130 selects the first discount (S150) and applies the first discount to the basic fee to set a discounted basic fee (S170).

When controller 130 determines that the cost paid to purchase gasoline is less than the predetermined amount X (NO in S140), controller 130 selects the second discount having a lower discount rate than the first discount (S160). Controller 130 applies the second discount to the basic fee to set a discounted basic fee, and registers it in user list 700 (S170).

Thus, a cost paid in the past by a user to purchase gasoline is used to discount a basic fee of EV car sharing. Thus, a fee setting system allowing a user shifting from utilizing a gasoline-powered vehicle to EV car sharing to enjoy a benefit of doing so encourages the user to do so.

Further, a discount rate for a basic fee is set depending on a cost paid to purchase gasoline. Specifically, a first discount is applied to the basic fee for a user whose cost paid to purchase gasoline is the predetermined amount X or more. For a user whose cost paid to purchase gasoline is less than the predetermined amount X, a second discount of a discount rate smaller than the first discount is applied to the basic fee. Thus, a fee setting system allowing a user who used a large amount of gasoline to enjoy a further benefit of shifting to EV car sharing encourages the user to shift to EV car sharing.

The predetermined amount X is an amount set as desired, and it is for example set to 10,000 yen.

While in the above example a cost paid to purchase gasoline is compared with the predetermined amount X and two types of discounts of a first discount and a second discount are applied to a basic fee, applying different discount rates depending on the cost paid to purchase gasoline suffices. For example, a plurality of different money zones may be set for costs paid to purchase gasoline and different discount rates may be set for the plurality of different money zones, respectively.

(Process for Calculating Power Used when Utilizing a Vehicle)

FIG. 7 is a flowchart showing a process performed in fee setting device 100 according to the first embodiment when a vehicle of fee setting system 1 is utilized.

When a user starts utilizing vehicle 300, e.g., when vehicle 300 shifts from the READY-OFF state to the READY-ON state, controller 130 receives start-of-utilization information and vehicle information from vehicle 300 (S200).

Controller 130 uses the obtained vehicle information to identify vehicle 300 that the user has started to utilize (S205). Controller 130 refers to the reservation list stored in storage unit 120 to identify the user who is using vehicle 300 (S210).

Controller 130 obtains information of an SOC that vehicle 300 has when utilizing it is started, and controller 130 stores the information to storage unit 120 (S215).

When the user ends utilizing vehicle 300, e.g., when vehicle 300 shifts from the READY-ON state to the READY-OFF state, controller 130 receives end-of-utilization information from vehicle 300 (S220).

When controller 130 receives the end-of-utilization information, controller 130 obtains information of SOC of vehicle 300 (S225). Controller 130 uses the SOC information obtained in S215 and the SOC information obtained in S225 to calculate power currently used by vehicle 300 (S230).

Controller 130 reads user list 700 from storage unit 120 and adds the power calculated in S230 to power used in the current month (S240). Controller 130 updates in user list 700 the power used in the current month (S240).

(Process for setting monthly utilization fee) FIG. 8 is a flowchart showing a process performed in fee setting device 100 according to the first embodiment in setting a utilization fee.

When a month ends and a subsequent month starts (or the first date of a month arrives) or when one month has elapsed since a time point at which utilization started, controller 130 calculates a utilization fee from one month before to the day before, based on matters registered in user list 700.

Controller 130 refers to user list 700 and reads an amount of power used by a user in the current month (S300). Controller 130 calculates a metered fee for the current month from an integration of a predetermined unit price of power and the amount of power used in the current month as read in S300 (S320).

Controller 130 determines whether the metered fee of the current month is higher than the basic fee (S330). If controller 130 determines that the metered fee of the current month is higher than the basic fee (YES in S330), controller 130 calculates a utilization fee by adding the basic fee and the metered fee together and sets it as the utilization fee for the current month (S340). If controller 130 determines that the metered fee of the current month is equal to or less than the basic fee (NO in S330), controller 130 determines that the utilization fee for the current month is the basic fee alone, and controller 130 sets it as the utilization fee for the current month (S350).

Thus, when a metered fee for a month is equal to or less than the basic fee, a utilization fee for that month is set to the amount of the basic fee alone. Thus, for example, even a user with a small discount rate applied to a basic fee can obtain a sufficient satisfaction with a fee charged to him/her, as no metered fee is charged when the metered fee has an amount equal to or less than the basic fee. Further, while a user who does not frequently utilize EV car sharing may be discontented with a basic fee charged to the user, the present fee setting system can alleviate the user's discontent with the basic fee charged to the user. The user can thus obtain a sufficient satisfaction with the fee.

(Process for Setting a Basic Fee for a Next Fiscal Year After User Registration)

FIG. 9 is a flowchart showing a process performed in fee setting device 100 according to the first embodiment in setting a basic fee for a next fiscal year.

When a year ends and a new year starts (or the first date of a new year arrives) or when one year has elapsed since a time point at which utilization started, controller 130 refers to user list 700 to calculate a total amount of metered fees charged to a user for the current year (S400). Controller 130 uses the total amount of metered fees for the current year as calculated in S400 to calculate an average monthly metered fee for the current year (S410).

Controller 130 determines whether the average monthly metered fee for the current year is equal to or more than a predetermined amount Y (S420). When controller 130 determines that the average monthly metered fee for the current year is equal to or more than the predetermined amount Y (YES in S430), controller 130 selects a first discount (S430) and applies the first discount to the basic fee to set a discounted basic fee (S450).

When controller 130 determines that the average monthly metered fee for the current year is less than the predetermined amount Y (NO in S420), controller 130 selects a second discount (S440) and applies the second discount to the basic fee to set a discounted basic fee (S450).

Thus, in setting a basic fee for a next fiscal year after user registration, an average monthly metered fee for the current fiscal year is referenced to determine the amount of a discount of the basic fee for the next fiscal year. Specifically, for a user whose average monthly metered fee is the predetermined amount Y or more, a first discount is applied to the basic fee for the next fiscal year. For a user whose average monthly metered fee is less than the predetermined amount Y, a second discount of a discount rate smaller than the first discount is applied to the basic fee for the next fiscal year. As a result, a user who frequently utilizes EV car sharing can obtain a high satisfaction with the fee.

The predetermined amount Y can be set as desired, and it is for example set to 5,000 yen.

In the first embodiment, for a user whose average monthly metered fee is the predetermined amount Y or more, a first discount is applied to the user's basic fee for the next fiscal year. For a user whose average monthly metered fee is less than the predetermined amount Y, a second discount is applied to the user's basic fee for the next fiscal year. Application of discount suffices insofar as different discount rates can be set for a user whose average monthly metered fee is equal to or more than the predetermined amount Y and a user whose average monthly metered fee is less than the predetermined amount Y. For example, it may be set such that no discount is applied to a user whose average monthly metered fee is less than the predetermined amount Y.

Furthermore, while one of two discounts, i.e., a first discount or a second discount, has been applied to a basic fee of a next fiscal year, applying different discount rates depending on the average monthly metered fee suffices. For example, a plurality of different money zones may be set for average monthly metered fees and different discount rates may be set for the plurality of different money zones, respectively.

In addition, a basic fee is also similarly set for a year subsequent to the next fiscal year after user registration.

Second Embodiment (Configuration of Fee Setting System)

In the first embodiment, an example has been described in which information about an owned vehicle is a cost paid to purchase gasoline. In a second embodiment, an example will be described in which information about an owned vehicle is trade-in price information of a vehicle which a user has once owned.

In the first embodiment, a cost paid to purchase gasoline is referenced to discount a car sharing fee to set an EV car sharing fee which makes shifting from utilizing a gasoline-powered vehicle to EV car sharing beneficial. In the second embodiment, whether a user's vehicle is traded in or not and a trade-in price are referenced to discount a car sharing fee to set an EV car sharing fee which makes shifting from utilizing his/her owned vehicle to EV car sharing beneficial. In the second embodiment, an example will be described in which when a user performs membership registration for EV car sharing, the user trades with the EV car sharing business operator to trade in a vehicle which the user owns.

A configuration of a fee setting system 1A according to the second embodiment is that of fee setting system 1 according to the first embodiment plus a business operator communication terminal 400. The configuration of fee setting system 1A according to the second embodiment is the same as the configuration of fee setting system 1 according to the first embodiment except for a function of a controller 130A of a fee setting device 100A and information stored in a storage unit 120A. Accordingly, no description will be repeated except for those for the function of business operator communication terminal 400, the function of controller 130A, and the information stored in storage unit 120A.

(Configuration of Fee Setting System)

Figure 10:
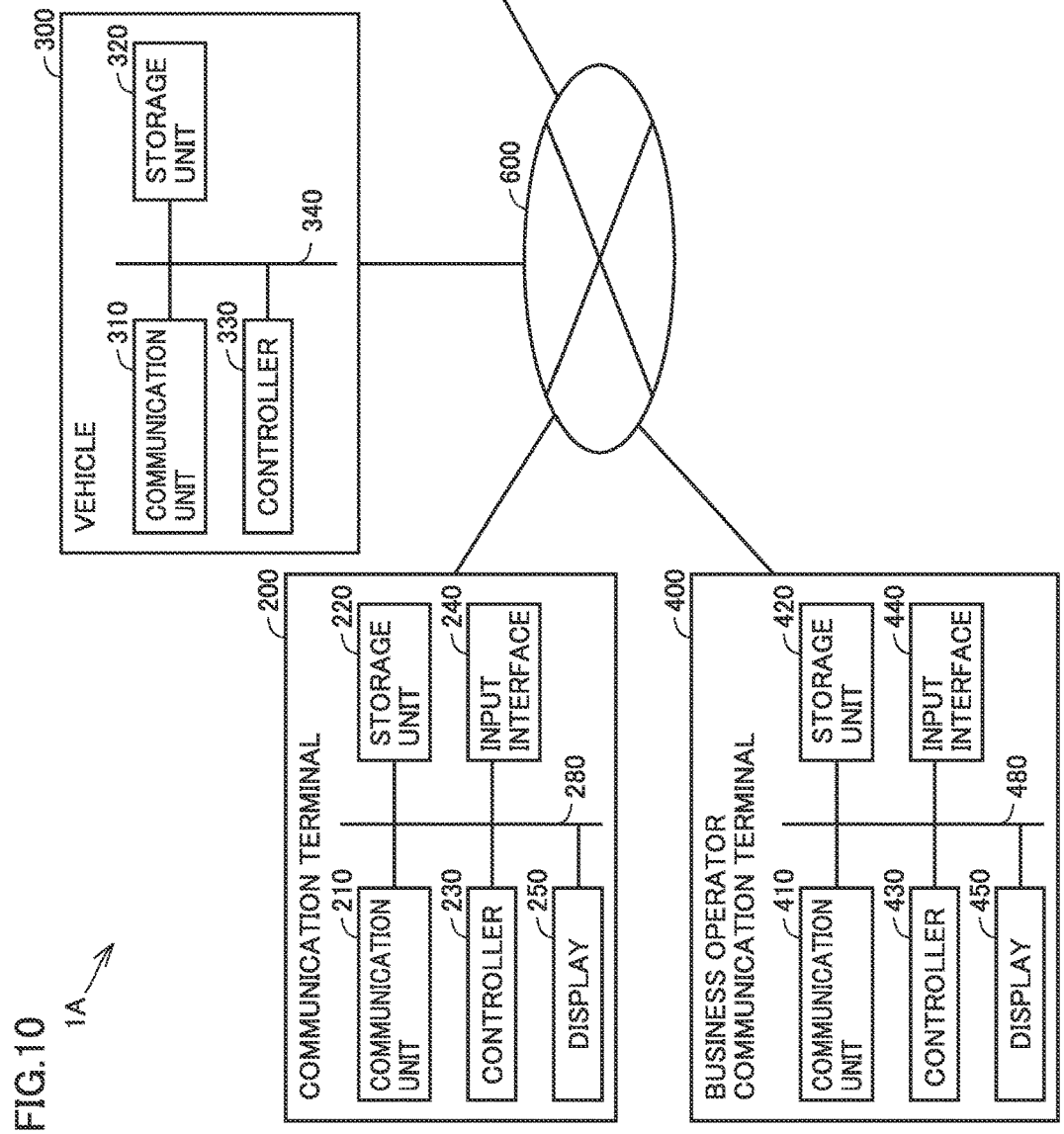
FIG. 10 is a diagram schematically showing an overall configuration of a fee setting system according to a second embodiment.

FIG. 10 is a diagram schematically showing an overall configuration of fee setting system 1A according to the second embodiment. As shown in FIG. 10, fee setting system 1A according to the second embodiment includes fee setting device 100A, communication terminal 200, vehicle 300, and business operator communication terminal 400.

As communication terminal 200 and vehicle 300 are the same in configuration as communication terminal 200 and vehicle 300 according to the first embodiment, they will not be described redundantly.

Fee setting device 100A includes communication unit 110, storage unit 120A, and controller 130A. Each component is communicatively connected by communication bus 140. As communication unit 110 is the same in configuration as communication unit 110 according to the first embodiment, it will not be described redundantly.

Storage unit 120A includes, for example, a large-capacity storage device such as a hard disk or a solid state drive. For example, information of a user who has membership for car sharing, trade-in price information as information about a vehicle once owned by the user, information about the SOC and position of vehicle 300, etc. are stored in storage unit 120A.

The trade-in price information includes information of a trade-in price when a user trades in his/her owned vehicle in making membership registration for car sharing, and information indicating whether a trade-in has been done. The information of whether a trade-in has been done is determined in controller 130 depending on whether information of a trade-in price is set.

A user list 700A and a previously created utilization fee list 800A, which will be described later, are stored in storage unit 120A.

Controller 130A includes CPU (central processing unit) 130a, memory (ROM and RAM) 130b, an input/output port (not shown) for inputting/outputting various signals, and the like. Controller 130A is configured to execute predetermined computation processing based on information stored in memory 130b, storage unit 120A and the like, information received from communication terminal 200 via communication unit 110, and/or the like. Controller 130A uses trade-in price information to set a car sharing utilization fee. Controller 130A will more specifically be described later.

Business operator communication terminal 400 is a communication terminal of an EV car sharing business operator. Business operator communication terminal 400 includes a communication unit 410, a storage unit 420, a controller 430, an input interface 440, and a display 450. Each component is communicatively connected by a communication bus 480.

Communication unit 410 is configured to be capable of communicating with communication unit 110 of fee setting device 100A. Communication units 110 and 410 communicate with each other via communication network 600.

Communication unit 410 is configured to be capable of communicating with communication unit 210 of communication terminal 200. Communication units 210 and 410 communicate with each other via communication network 600.

Storage unit 420 includes, for example, a large-capacity storage device such as a hard disk or a solid state drive. Storage unit 420 stores for each user information of whether the user has traded in his/her vehicle, a trade-in price, and the like.

Controller 430 is configured to execute predetermined computation processing based on information stored in storage unit 420 and information received from fee setting device 100A or communication terminal 200 via communication unit 410, for example. Controller 430 transmits via communication unit 410 to fee setting device 100A a trade-in price that is input via input interface 440.

Input interface 440 is an input device in business operator communication terminal 400. Input interface 440 is composed of a keyboard, a mouse, a touch panel, and the like, and accepts input operations done via the keyboard, the mouse, the touch panel, and the like. For example, when an assessment of a trade-in price of a vehicle owned by a user is done, the trade-in price is input to input interface 440.

Display 450 is a display device controlled by controller 430 to display an image. Display 450 is implemented for example as a liquid crystal panel or the like.

Figures 11, 12, 13:
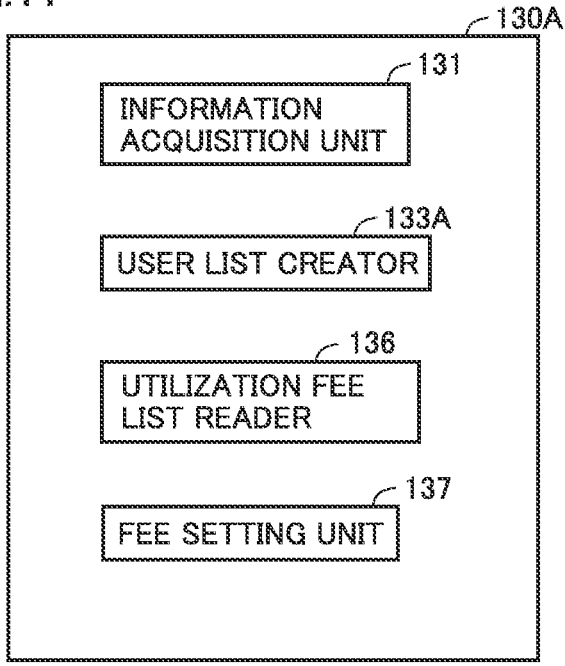
FIG. 11 is a functional block diagram showing a configuration of a controller of a fee setting device according to the second embodiment.
FIG. 12 is a diagram showing an example of a configuration of a utilization fee list according to the second embodiment.
FIG. 13 is a diagram showing an example of a configuration of a user list according to the second embodiment.

FIG. 11 is a functional block diagram showing a configuration of controller 130A of fee setting device 100A according to the second embodiment. Controller 130A includes information acquisition unit 131, a user list creator 133A, utilization fee list reader 136, and fee setting unit 137. Information acquisition unit 131 and fee setting unit 137 are the same as controller 130 in the first embodiment, and accordingly, they will not be described redundantly.

User list creator 133A creates user list 700A, which will be described later, based on information received from communication terminal 200, information received from business operator communication terminal 400 and the like, and stores user list 700A to storage unit 120A. Whenever information to be registered in user list 700A is received, user list creator 133A updates user list 700A and stores it to storage unit 120A.

Utilization fee list reader 136 reads utilization fee list 800A previously created and stored in storage unit 120A.

In the second embodiment, when a user who utilizes his/her owned vehicle shifts to EV car sharing, and in doing so, trades with the EV car sharing business operator to trade in the vehicle, the trade-in price of the vehicle is used to discount an EV car sharing utilization fee. Specifically, a discount for a basic fee is set depending on whether a trade-in is done. When the user trades in his/her vehicle, a trade-in discount is applied to discount a basic fee. In addition, when a trade-in is done, a discount for a metered fee is set depending on the trade-in price. As will be described later, similarly as has been described in the first embodiment, a utilization fee is set from a basic fee and a metered fee.

Applying a trade-in discount in setting a fee encourages a user who owns a vehicle to shift to EV car sharing. Furthermore, as a discount rate applied to a metered fee is determined depending on a trade-in price, a fee system is provided which provides a high degree of satisfaction to users who own vehicles of different prices.

For the EV car sharing in the second embodiment, as well as that in the first embodiment, a user registered as a user of EV car sharing is charged for each unit period of time a utilization fee charged for that unit period of time. A basic fee and a metered fee are set for the utilization fee. The basic fee varies every predetermined period of time composed of a plurality of unit periods of time. In the second embodiment as well, the metered fee is calculated from a product of an amount of power used and a unit price of power.

(Utilization Fee List 800A)

FIG. 12 is a diagram showing an example of a configuration of a utilization fee list according to the second embodiment. As shown in FIG. 12, whether a trade-in has been done, a basic fee, and a metered fee rate are registered in the utilization fee list. Utilization fee list 800A indicates that a basic fee is set depending on whether a trade-in has been done. Further, utilization fee list 800A indicates that a metered fee rate is set depending on whether a trade-in has been done and a trade-in price. The metered fee rate is applied to set a discount rate applied to a unit price of power in a metered fee calculated from a product of an amount of power used and the unit price of power. In the second embodiment, a discount rate for a unit price of power is set to be larger in an order of rate 4, rate 3, rate 2, rate 1 (i.e., rate 4>rate 3>rate 2>rate 1). It should be noted that utilization fee list 800A is stored in storage unit 120A.

When there is no trade-in, the basic fee is set to a basic fee A. When there is a trade-in, the basic fee is set to a basic fee B, which is a smaller amount than basic fee A.

When there is no trade-in, the metered fee rate is set to rate 1 which applies no discount to a unit price of power.

When there is a trade-in, the metered fee rate is set according to a trade-in price T. In the second embodiment, trade-in price T is divided into three cases: being less than a predetermined amount Z (T<Z); being the predetermined amount Z or more and less than a predetermined amount W larger than the predetermined amount Z (Z≤T<W); and being the predetermined amount W or more (W≤T).

When trade-in price T is less than the predetermined amount Z, rate 2 which applies a discount to the unit price of power is set as a metered fee rate. When trade-in price T is the predetermined amount Z or more and less than the predetermined amount W, rate 3 which applies a larger discount rate to the unit price of power than rate 2 is set. When trade-in price T is the predetermined value W or more, rate 4 which applies a larger discount rate to the unit price of power than rate 3 is set.

(User List 700A)

FIG. 13 is a diagram showing an example of a configuration of user list 700A according to the second embodiment. As shown in FIG. 13, in the second embodiment, a user ID, whether a trade-in has been done, trade-in price T, a trade-in discount, and a metered fee rate are registered in user list 700A.

When a user completes membership registration for EV car sharing, a user ID is issued for that user and used to identify the user.

Whether a trade-in is done is registered when the user performs membership registration for EV car sharing, and this is done based on information selected by the user using communication terminal 200. When the user selects trading with the EV car sharing business operator to trade in his/her owned vehicle, "O" is indicated, as shown in FIG. 13. When the user does not select trading with the EV car sharing business operator to trade in his/her owned vehicle, "-" is indicated, as shown in FIG. 13. "O" in a "whether a trade-in has been done" field indicates that trade-in price T is set, whereas "-" in a "whether a trade-in has been done" field indicates that trade-in price T is not set.

Trade-in price T is determined as follows: when a user selects trading in his/her owned vehicle, the vehicle's price is assessed by the EV car sharing business operator, and trade-in price T is determined. When trade-in price T is input to business operator communication terminal 400 of the EV car sharing business operator, trade-in price T is transmitted from business operator communication terminal 400 to fee setting device 100A and registered in user list 700A.

Whether a trade-in discount is applied is determined depending on whether a trade-in has been done. If a trade-in has been done, a trade-in discount is applied to discount a basic fee. If no trade-in has been done, a trade-in discount is not applied. Whether a trade-in has been done is determined with reference to the "whether a trade-in has been done" column. Whether a trade-in has been done may be determined depending on whether a trade-in price is set in user list 700A at the column of trade-in price T.

The metered fee rate is a discount rate applied to a unit price of power used in calculating a metered fee. The metered fee rate is set with reference to utilization fee list 800A in accordance with trade-in price T.

In FIG. 13, the user with user ID 001 trades in his/her owned vehicle. Accordingly, with reference to utilization fee list 800A, the basic fee is set to basic fee B. Trade-in price T of the owned vehicle traded in is assessed as a price T1 higher than the predetermined amount W. Accordingly, with reference to utilization fee list 800A, the metered fee rate is set to rate 4.

The user with user ID 002 does not trade in his/her owned vehicle. Accordingly, with reference to utilization fee list 800A, the basic fee is set to basic fee A, and the metered fee rate is set to rate 1.

The user with user ID 003 trades in his/her owned vehicle. Accordingly, with reference to utilization fee list 800A, the basic fee is set to basic fee B. Trade-in price T of the owned vehicle traded in is assessed as a price T2 lower than the predetermined amount Z. Accordingly, with reference to utilization fee list 800A, the metered fee rate is set to rate 2.

Process for Setting Utilization Fee

Figure 14:
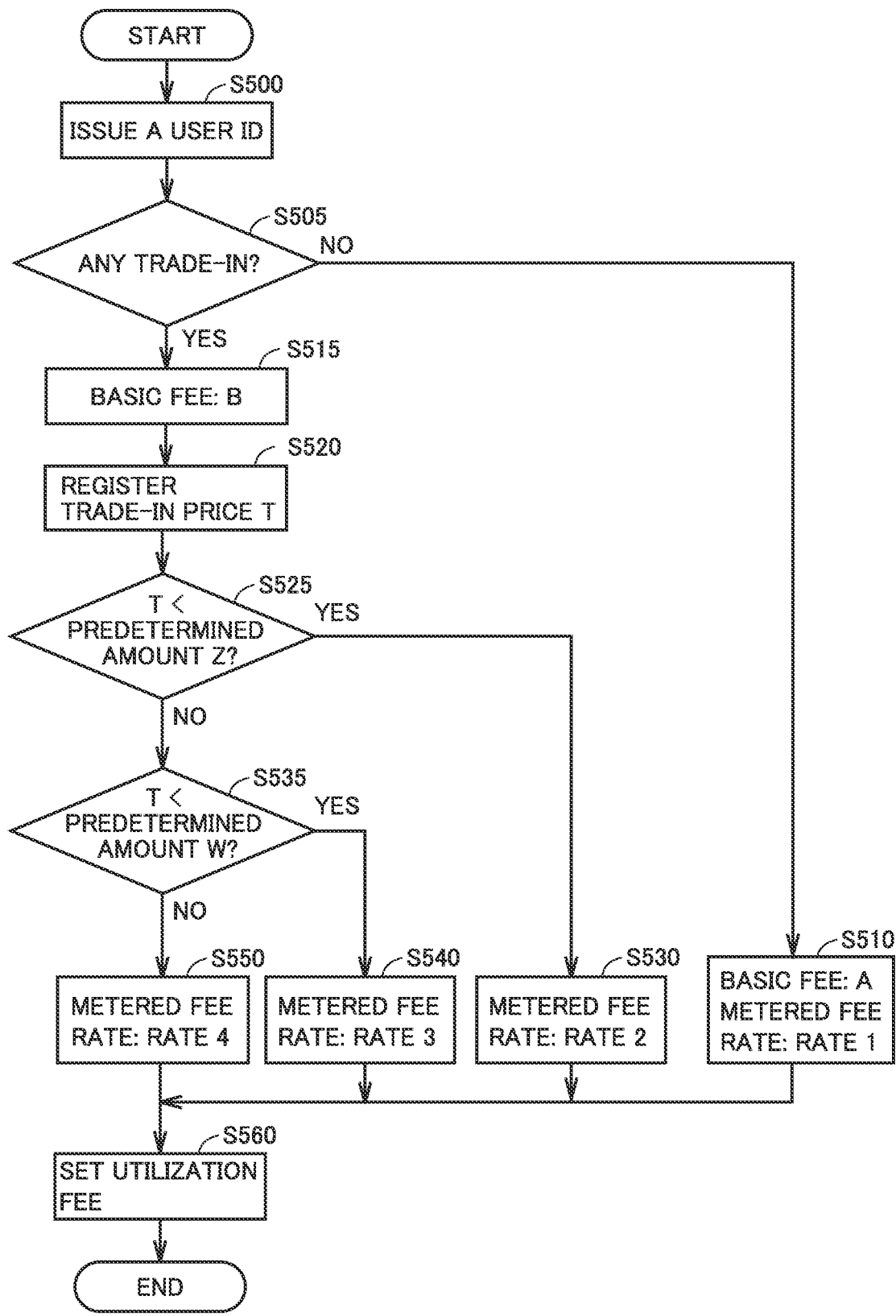
FIG. 14 is a flowchart showing a process performed in the fee setting device according to the second embodiment in setting a utilization fee.

FIG. 14 is a flowchart showing a process performed in fee setting device 100A according to the second embodiment in setting a utilization fee. While each step shown in the flowchart shown in FIG. 14 is implemented by software processing done by fee setting device 100A, a part thereof may be implemented by hardware (or electric circuitry) fabricated in fee setting device 100A.

When controller 130A receives information from a user's communication terminal 200 via communication unit 110 regarding user registration for EV car sharing, controller 130A registers the received information and issues a user ID (S500).

Controller 130A issues a request via communication unit 110 to communication terminal 200 to ask the user whether the user trades in his/her owned vehicle (S505). When a selection to avoid trading in the vehicle is made from communication terminal 200 via communication unit 110 (NO in S505), Controller 130A selects basic fee A as a basic fee and selects rate 1 as a metered fee rate with reference to utilization fee list 800A (S510).

When a selection to do a trade-in is made (YES in S505), controller 130A selects basic fee B as a basic fee with reference to utilization fee list 800A (S515). Once the owned vehicle has been assessed and trade-in price T has been determined, trade-in price T is input from business operator communication terminal 400. Upon receiving trade-in price T via communication unit 110, controller 130A registers trade-in price T in user list 700A (520).

Controller 130A determines whether trade-in price T is less than the predetermined amount Z (S525). If it is determined in S525 that trade-in price T is less than the predetermined amount Z (YES in S525), controller 130A selects rate 2 as a metered fee rate with reference to utilization fee list 800A (S530).

If it is determined that trade-in price T is not less than the predetermined amount Z (NO in S525), controller 130A determines whether trade-in price T is less than the predetermined amount W (S535).

If it is determined in S535 that trade-in price T is less than the predetermined amount W (YES in S535), controller 130A selects rate 3 as a metered fee rate with reference to utilization fee list 800A (S540).

If it is determined that trade-in price T is not less than the predetermined amount W (NO in S535), controller 130A selects rate 4 as a metered fee rate with reference to utilization fee list 800A (S550)

Controller 130A registers in user list 700A the basic fees and metered fee rates that are selected in S510, S515, S530, S540 and S550, and sets a utilization fee (S560).

Thus, in the second embodiment, for a user who trades in his/her owned vehicle, basic fee B is set that is an amount smaller than basic fee A of a user who does not trade in his/her owned vehicle. In this manner, setting a fee can be done to allow a user who trades in his/her owned vehicle to enjoy a benefit in shifting to EV car sharing. This encourages a user who utilizes his/her owned vehicle to shift to EV car sharing.

In addition, when an owned vehicle is traded in, a discount can be applied to a metered fee in accordance with trade-in price T. The higher trade-in price T is, the higher a discount rate for a metered fee is. This can provide a fee system satisfying any user having a vehicle in any price range. This can encourage different classes of customers to shift to EV car sharing.

While in the second embodiment, trade-in price T is divided into three price zones, setting a metered fee according to trade-in price T suffices, and dividing trade-in price T into three price zones is not a limitation. For example, trade-in price T may be divided into four or more price zones, or it may be divided into two or less price zones.

Furthermore, while a metered fee is discounted using a rate determined depending on trade-in price T, discounting a metered fee depending on trade-in price T suffices. For example, trade-in price T divided by the number of unit periods of time that are included in a predetermined period of time may be discounted from a metered fee in the predetermined period of time.

First Modification

In the second embodiment, a basic fee is discounted depending on whether a trade-in has been done, and a metered fee is discounted depending on trade-in price T. A basic fee may be discounted depending on whether a trade-in has been done, and the basic fee may further be discounted depending on trade-in price T. In the first modification an example will be described in which a basic fee is discounted depending on whether a trade-in has been done, and the basic fee is further discounted depending on trade-in price T.

FIG. 15 is a diagram showing an example of a configuration of a utilization fee list 800B according to the first modification. As shown in FIG. 15, whether a trade-in has been done and a basic fee are registered in utilization fee list 800B. Utilization fee list 800B indicates that a basic fee is set depending on whether a trade-in has been done and a trade-in price. It should be noted that utilization fee list 800B is stored in storage unit 120A.

When there is no trade-in, the basic fee is set to a basic fee C. When there is a trade-in, a basic fee is set according to trade-in price T. In the first modification, trade-in price T is divided into three cases: being less than a predetermined amount J (T<J); being the predetermined amount J or more and less than a predetermined amount K larger than the predetermined amount J (J≤T<K); and being the predetermined amount K or more (K≤T).

When trade-in price T is less than the predetermined amount J, the basic fee is set to a basic fee D, which is a smaller amount than basic fee C. When trade-in price T is the predetermined amount J or more and less than the predetermined amount K, the basic fee is set to a basic fee E, which is a smaller amount than basic fee D. When trade-in price T is the predetermined amount K or more, the basic fee is set to a basic fee F, which is a smaller amount than basic fee E.

FIG. 16 is a diagram showing an example of a configuration of a user list 700B according to the first modification. As shown in FIG. 16, in the first modification, a user ID, whether a trade-in has been done, trade-in price T, and a trade-in discount are registered in user list 700B.

Whether a trade-in discount is applied is determined depending on whether the trade-in has been done. If a trade-in has been done, a trade-in discount is applied to discount a basic fee. Furthermore, if a trade-in has been done, a trade-in discount allows a discount to be set according to trade-in price T. A discount according to trade-in price T is set with reference to utilization fee list 800A. If no trade-in has been done, a trade-in discount is not applied. Whether a trade-in has been done is determined with reference to the "whether a trade-in has been done" column. Whether a trade-in has been done may be determined depending on whether a trade-in price is set in user list 700B at the column of trade-in price T.

In FIG. 16, the user with user ID 001 trades in his/her owned vehicle. Trade-in price T of the owned vehicle traded in is assessed as a price T3 higher than the predetermined amount K. Accordingly, with reference to utilization fee list 800B, the basic fee is set to basic fee F.

The user with user ID 002 does not trade in his/her owned vehicle. Accordingly, with reference to utilization fee list 800B, the basic fee is set to basic fee C.

The user with user ID 003 trades in his/her owned vehicle. Trade-in price T of the owned vehicle traded in is assessed as a price T4 lower than the predetermined amount J. Accordingly, with reference to utilization fee list 800B, the basic fee is set to basic fee D.

In this manner, similarly as has been described in the second embodiment, setting a fee can be done to allow a user who trades in his/her owned vehicle to enjoy a benefit in shifting to EV car sharing. This encourages a user who utilizes his/her owned vehicle to shift to EV car sharing. The higher trade-in price T is, the higher a discount rate for a basic fee is. This can provide a fee system satisfying any user having a vehicle in any price range. This can encourage different classes of customers to shift to EV car sharing.

Method for Setting Utilization Fee

Figure 17:
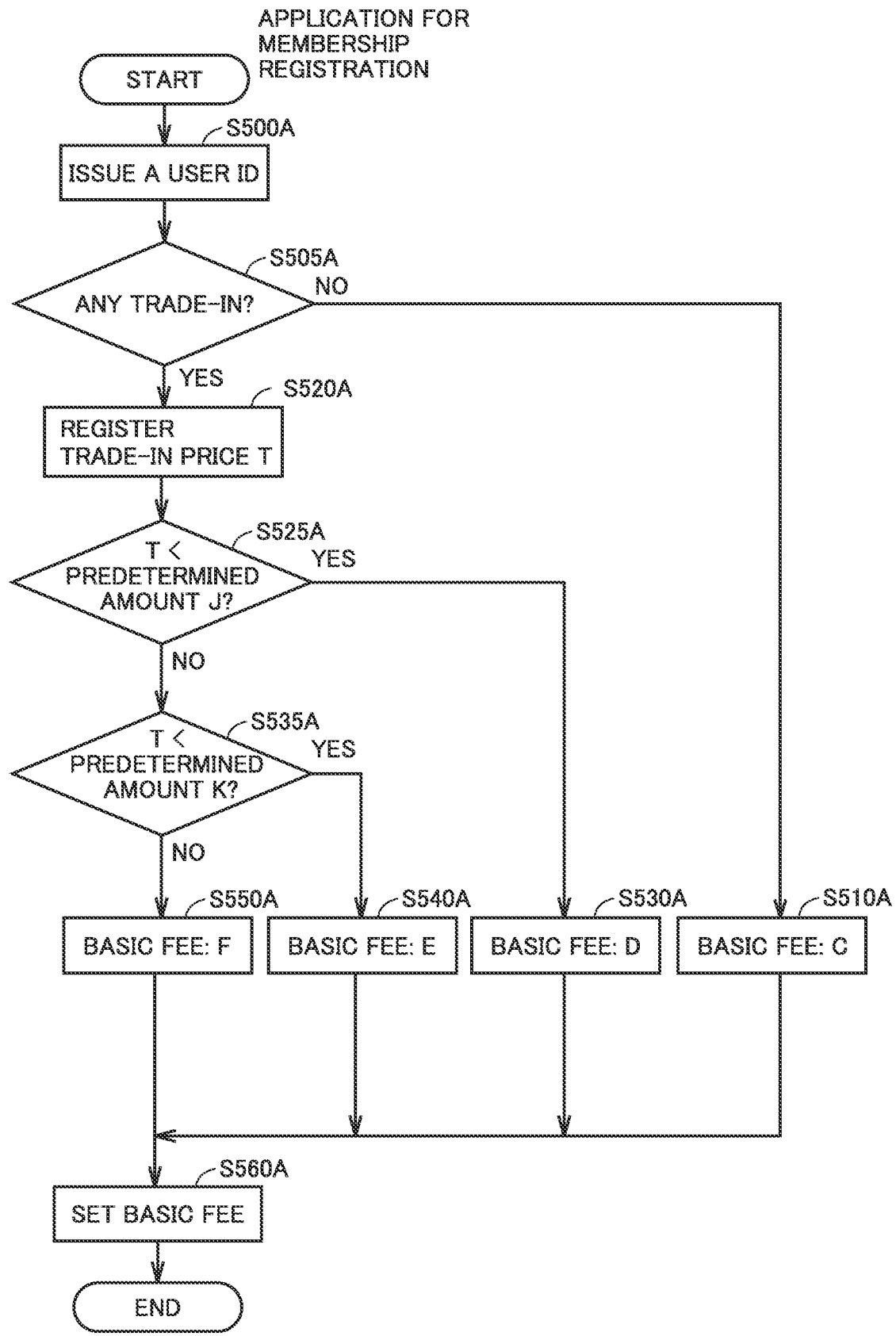
FIG. 17 is a flowchart showing a process performed in the fee setting device according to the first modification in setting a utilization fee.

FIG. 17 is a flowchart showing a process performed in fee setting device 100A according to the first modification in setting a utilization fee. While each step shown in the flowchart shown in FIG. 17 is implemented by software processing done by fee setting device 100A, a part thereof may be implemented by hardware (or electric circuitry) fabricated in fee setting device 100A.

When controller 130A receives information from a user's communication terminal 200 via communication unit 110 regarding user registration for EV car sharing, controller 130A registers the received information and issues a user ID (S500A).

Controller 130A issues a request via communication unit 110 to communication terminal 200 to ask the user whether the user selects trading in his/her owned vehicle (S505A). When a selection to avoid trading in the vehicle is made from communication terminal 200 via communication unit 110 (NO in S505A), controller 130A selects basic fee C as a basic fee with reference to utilization fee list 800B (S510A).

When a selection to do a trade-in is made (YES in S505A), controller 130A assesses the vehicle. Once the vehicle has been assessed and trade-in price T has been determined, trade-in price T is input from business operator communication terminal 400. Upon receiving trade-in price T via communication unit 110, controller 130A registers trade-in price T in user list 700B (S520A).

Controller 130A determines whether trade-in price T is less than the predetermined amount J (S525A). If it is determined in S525A that trade-in price T is less than the predetermined amount J (YES in S525A), controller 130A selects basic fee D as a basic fee with reference to utilization fee list 800B (S530A).

When it is determined that trade-in price T is not less than the predetermined amount J (NO in S525A), controller 130A determines whether trade-in price T is less than the predetermined amount K (S535A).

If it is determined in S535A that trade-in price T is less than the predetermined amount K (YES in S535A), controller 130A selects basic fee E as a basic fee with reference to utilization fee list 800B (S540A).

If it is determined that trade-in price T is not less than the predetermined amount K (NO in S535A), controller 130A selects basic fee F as a basic fee with reference to utilization fee list 800B (S550A).

Controller 130A registers in user list 700B the basic fees that are selected in S510A, S530A, S540A, and S550A, and sets a utilization fee (S560A).

Thus, in the first modification, for a user who trades in his/her owned vehicle, a basic fee is set that is an amount smaller than basic fee C of a user who does not trade in his/her owned vehicle. Setting a fee can be done to allow a user who trades in his/her owned vehicle to enjoy a benefit in shifting to EV car sharing. This encourages a user who utilizes his/her owned vehicle to shift to EV car sharing.

In addition, when an owned vehicle is traded in, a discount can be applied to a basic fee in accordance with trade-in price T. The higher trade-in price T is, the higher a discount rate for a basic fee is. This can provide a fee system satisfying any user having a vehicle in any price range. This can encourage different classes of customers to shift to EV car sharing.

In the second embodiment, a basic fee is discounted depending on whether a trade-in has been done, and a metered fee is discounted depending on trade-in price T. In the first modification a basic fee is discounted depending on whether a trade-in has been done, and the basic fee is further discounted depending on trade-in price T. A metered fee may be discounted depending on whether a trade-in has been done, and the metered fee may further be discounted depending on trade-in price T. Setting a fee can be done in the same manner as the first modification, and accordingly, will not be described specifically.

Second Modification

While in the first and second embodiments and the first modification an example has been described in which a user trades with a car sharing business operator to trade in a vehicle owned by the user, being capable of determining whether a trade-in has been done and a trade-in price suffices. For example, the user may trade with a dealer other than the car sharing business operator to trade in the user's vehicle.

When the user trades with a dealer other than the car sharing business operator to trade in the user's owned vehicle, a utilization fee is discounted for the fact that the user shifts from utilizing his/her owned vehicle to EV car sharing. Such a fee setting system flexibly discounting a utilization fee allows a user who trades in his/her owned vehicle to enjoy a benefit in shifting to EV car sharing. This encourages a user who utilizes his/her owned vehicle to shift to EV car sharing.

It should be understood that the embodiments disclosed herein have been described for the purpose of illustration only and in a non-restrictive manner in any respect. The scope of the present disclosure is defined by the terms of the claims, and is intended to include any modifications within the meaning and scope equivalent to the terms of the claims.

What is claimed is:

1. A fee setting device configured to set for a user a utilization fee for sharing an electric vehicle, comprising:
a fee setting controller having a processor for executing programs stored in memory, an input port for receiving signals, and an output port for transmitting signals; and
a storage device configured to store information about a vehicle previously owned by the user,
wherein the fee setting controller is configured to set the utilization fee using the information,
wherein the information includes a cost paid to purchase fuel for the previously owned vehicle within a determined period of time in a past two years, and
wherein when the electric vehicle shifts from a READY-OFF state to a READY-ON state, the fee setting controller receives start-of-utilization information serving as notification that utilization of the electric vehicle has started, and together with that information, the fee setting controller receives vehicle information serving as information for identifying the electric vehicle.

2. A fee setting system comprising:
a fee setting device configured to set a utilization fee for sharing an electric vehicle, the fee setting device including a communication device, a storage device, and a controller, the controller having a processor for executing programs stored in memory, an input port, and an output port,
the fee setting device being configured to:
receive and transmit signals via the input and output ports;
store information about a vehicle previously owned by a user; and
set the utilization fee using the information,
wherein the information includes a cost paid to purchase fuel for the previously owned vehicle within a determined period of time in a past two years, and
wherein when the electric vehicle shifts from a READY-OFF state to a READY-ON state, the fee setting device receives start-of-utilization information serving as notification that utilization of the electric vehicle has started, and together with that information, the fee setting device receives vehicle information serving as information for identifying the electric vehicle.

* * * * *